April 30, 1968     M. L. BENJAMIN ET AL     3,380,746
QUICK CHANGE CHUCK
Filed Feb. 27, 1967
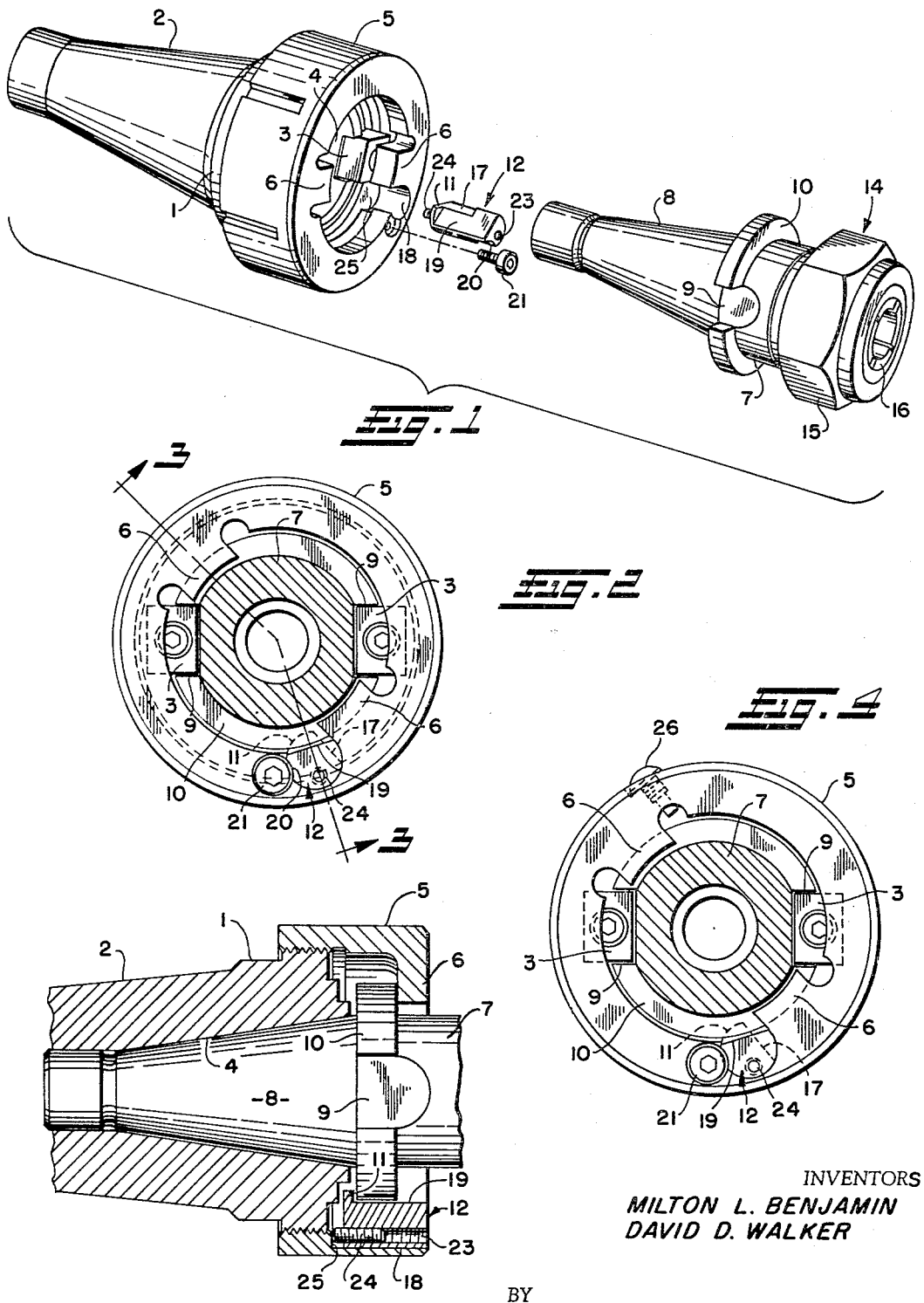
INVENTORS
MILTON L. BENJAMIN
DAVID D. WALKER
BY Oberlin, Maky, Donnelly & Renner
ATTORNEYS 3,380,746
QUICK CHANGE CHUCK
Milton L. Benjamin and David D. Walker, Chagrin Falls, Ohio, assignors to Erickson Tool Company, Solon, Ohio, a corporation of Ohio
Filed Feb. 27, 1967, Ser. No. 618,726
7 Claims. (Cl. 279—91)

ABSTRACT OF THE DISCLOSURE

A quick change chuck including a tool adapter and holder releasably locked together by a key received in a slot in a flange on the tool adaptor. A nut threaded onto the tool holder has a lug which when rotated in one direction forces the tool adapter into seated engagement with the holder, and when rotated in the other direction has an axially adjustable release member which engages the tool adapter flange to release the tool adapter from the holder.

---

The present invention relates generally as indicated to a quick change chuck and more particularly to a quick change chuck of the type which includes a holder and a flanged tool adapter which is simply axially inserted into the holder, and part-turn rotation of the holder nut in opposite directions respectively clamps and releases the tool adapter.

More particularly, the present invention relates to improvements in a quick change chuck as disclosed in the Milton L. Benjamin et al. Pat. No. 2,727,748 dated Dec. 20, 1955 to achieve such automatic tool adapter clamping and releasing when the holder nut is turned in opposite directions.

Accordingly, it is a principal object of this invention to provide a quick change chuck having a clamping nut which is equipped with a stop and release effective, not only to align the nut lugs with the keys of the holder, but also to unclamp or release the tool adapter when the nut is rotated from clamping position to unclamping position.

Other objects and advantages of the present invention will become apparent as the following description proceeds.

To the accomplishment of the foregoing and related ends, the invention, then, comprises the features hereinafter fully described and partioularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is an exploded perspective view of a preferred embodiment of the invention showing the holder ready for insertion of the tool adapter;

FIG. 2 is an end elevation view showing the tool adapter inserted into the holder and the holder nut turned to securely clamp the adapter in the holder;

FIG. 3 is a cross-section view taken substantially along the line 3—3, FIG. 2; and FIG. 4 is an end elevation view similar to FIG. 2 except illustrating a modification.

Referring now in detail to FIGS. 1, 2, and 3, the holder 1 of the chuck is herein shown for purposes of illustration as comprising a tapered shank 2 adapted to be seated in a milling machine spindle or the like. It is to be understood that the holder 1 may be otherwise fashioned for use with boring mills, drill presses, turret lathes, etc. In the case of a turret lathe, for example, the holder 1 may be provided with a rectangular flange for bolting onto a lathe turret.

The holder 1 has a threaded end portion with axially projecting keys 3, 3 and a tapered socket 4.

A nut 5 has threaded engagement with said holder 1 and has radially inwardly extending lugs 6, 6 which, in the FIG. 1 position of said nut 5, are aligned with the holder keys 3, 3 so that the tool adapter 7 which comprises another element of the quick change chuck may be axially inserted through the nut 5 with the tapered adapter shank 8 disposed within the socket 4 and with the slots 9, 9 in the flange 10 receiving the projecting portions of the holder keys 3, 3. When the tool adapter is thus inserted, the outer face of flange 10 is disposed axially inward of the inner faces of said lugs 6, 6.

Furthermore, the tool adapter 7 (when thus inserted) has the inner face of the flange 10 engaged with the radial shoulder 11 of the stop and release member 12 in the nut 5.

Herein by way of illustrative example, the tool adapter 7 is shown as having a collet chuck 14 of a type wherein the tightening of the nose piece 15 will contract the collet 16 into gripping engagement with the shank of a drill or like tool. It is to be understood that this end of the tool adapter 7 may be fashioned for mounting an end mill, a shell and face mill, a boring head, a taper shank drill, or the like.

When the nut 5 is rotated from the FIG. 1 to the FIG. 2 position, it will advance to the left as shown in FIG. 3, whereby the lugs 6, 6 will engage the outer face of the flange 10, thus to firmly seat the tapered shank 8 in the tapered socket 4. Of course, the keys 3, 3 engaged in the slots 9, 9 will prevent rotation of the tool adapter 7 with respect to the holder 1.

When it is desired to release the tool adapter 7 for ready withdrawal and replacement, the nut 5 is rotated back to the FIG. 1 position to align its lugs 6, 6 with the keys 3, 3 and the slots 9, 9 and, in so rotating the nut 5, the side 17 of the member 12 will engage the adjacent side of one key 3 and the shoulder 11 will engage the inner face of the flange 10 to pull back and thus release the tool adapter 7 from seated engagement in the tapered socket 4. The tool adapter 7 can then be freely axially withdrawn and another one inserted.

As best shown in FIG. 1, the combined stop and release member 12 is in the form of a cylindrical pin which fits into a corresponding recess 18 in the nut 5 adjacent one lug 6 thereof, said member 12 having (a) a first flat 19 thereon which leaves the shoulder 11 operative as aforesaid to engage the inner face of the tool adapter flange 10, (b) a second flat 17 which provides a stop surface engageable, as shown in FIG. 1, with one side of the adjacent holder key 3, (c) an arcuate recess 20 which is complemental with the head of the retainer screw 21 threaded into the nut 5 thus to prevent rotation and axial withdrawal of member 12, and (d) a threaded opening 23 therethrough in which is disposed an adjusting screw 24 which abuts a shoulder 25 in the nut 5. The adjusting screw 24 will be adjusted so that when the nut 5 is in the FIG. 1 position, the shoulder 11 of the member 12 will be engaged with the inner face of the tool adapter flange 10 to keep the adapter shank 8 out of seating engagement with the holder socket 4. At that time, the inner faces of the nut lugs 6, 6 will be spaced slightly from the outer face of the adapter flange 10. Of course, when the nut 5 is rotated to the clamping position of FIGS. 2 and 3, the shoulder 11 will move away from the rear face of the adapter flange 10 and the inner faces of the lugs 6, 6 will move into contact with the outer face of flange 10 thus to force the adapter 7 into firm seated engagement within the holder socket 4.

As evident, the tool adapter 7 when inserted into the holder 1 will be clamped in the holder 1 and released therefrom simply by a part-turn rotation of the nut respectively from the FIG. 1 position to the FIG. 2 position and back from the FIG. 2 to the FIG. 1 position. When it has been determined at what rotary position the nut 5 (without member 12) will properly clamp a tool adapter 7 upon part turn rotation of the nut 5 from the FIG. 1 position, the member 12 and screw 21 may be inserted and adjusting screw 24 turned so that the shoulder 11 will prevent seating of the shank 8 in the socket 4 when the tool adapter 7 is initially inserted into the holder 1. In this way, as the nut 5 is turned to the FIG. 2 clamping position, the lugs 6, 6 will push the tool adapter 7 into firm seated engagement in the holder 1, and as the nut 5 is turned back to the FIG. 1 position the shoulder 11 will release the tool adapter 7 from the holder 1 for ready axial withdrawal from the holder 1.

The quick change chuck of FIG. 4 is the same as that of FIGS. 1 to 3 except that the nut 5 is provided with a stop screw 26 which is adapted to engage the upper side of the left key 3 to constitute a stop for alignment of the lugs 6, 6 with the keys 3, 3. In that case, the side 17 of the member 12 may be relieved to clear the bottom side of the right key 3 thus to prevent imposition of lateral force on said member 12.

Other modes of applying the principle of the invention may be employed, change being made as regards the details described, provided the features stated in any of the following claims, or the equivalent of such, be employed.

We therefore particularly point out and distinctly claim as our invention:

1. A quick change chuck comprising a holder, a tool adapter adapted to be releasably locked in said holder, said tool adapter having an axially slotted flange, said holder having a key adapted to fit into a slot in said tool adapter flange to hold said tool adapter from rotation relative to said holder, a nut having threaded engagement with said holder and having an opening for passage of said tool adapter flange therethrough, said nut also having a radially inwardly extending lug which is alignable with said key to permit insertion of said tool adapter flange inwardly of said lug with the slot in said flange interfitting said key, said nut, when rotated in one direction, being effective through said lug engaging said tool adapter flange to press said tool adapter into seated engagement with said holder, said nut having a release member movable therewithin, said release member having a shoulder portion engageable with the inner side of said tool adapter flange for unseating said tool adapter from said holder as said nut is rotated in the opposite direction back to the position whereat said lug is aligned with said key, and means mounting said release member for axial movement relative to said nut to permit axial adjustment of said release member to a position whereat said shoulder will engage said tool adapter flange during such rotation of said nut in the opposite direction to release said tool adapter as aforesaid.

2. The quick change chuck of claim 1 wherein said last-mentioned means comprises an adjusting screw in threaded engagement with said release member, said adjusting screw bearing on said nut to permit axial adjustment of said release member as aforesaid.

3. The quick change chuck of claim 1 wherein said release member comprises a generally cylindrical pin fitted in an axial recess in said nut; and wherein said pin is formed with a first cutaway portion which leaves said shoulder for engaging the inner face of said flange.

4. The quick change chuck of claim 3 wherein said pin has an arcuate cutaway portion which is overlapped by the head of a screw in said nut to prevent axial withdrawal of said pin and to hold said pin against rotation in said recess.

5. The quick change chuck of claim 1 further comprising stop means for interrupting the rotation of said nut in the opposite direction when said lug is aligned with said key as aforesaid.

6. The quick change chuck of claim 5 wherein said stop means comprises a stop screw on said nut which is adapted to engage said key during rotation of said nut in the opposite direction when said lug is aligned with said key as aforesaid.

7. The quick change chuck of claim 1 wherein said tool adapter flange is axially slotted at diametrically opposite points; said holder has diametrically opposite keys adapted to fit in the slots of said flange to hold said tool adapter from rotation relative to said holder; and said nut has a pair of diametrically opposite radially inwardly extending lugs which are alignable with the respective keys for permitting insertion of said tool adapter to have the slots in said flange interfitting said keys.

References Cited
UNITED STATES PATENTS

| | | | |
|---|---|---|---|
| 1,973,942 | 9/1934 | Buhr | 279—49 |
| 2,212,406 | 8/1940 | Rusnak | 279—91 |
| 3,197,219 | 7/1965 | Wahlstrom | 279—91 |

ROBERT C. RIORDON, *Primary Examiner.*